United States Patent
Yagi et al.

(10) Patent No.: US 10,257,213 B2
(45) Date of Patent: Apr. 9, 2019

(54) EXTRACTION CRITERION DETERMINATION METHOD, COMMUNICATION MONITORING SYSTEM, EXTRACTION CRITERION DETERMINATION APPARATUS AND EXTRACTION CRITERION DETERMINATION PROGRAM

(71) Applicant: NIPPON TELEGRAPH AND TELEPHONE CORPORATION, Chiyoda-ku (JP)

(72) Inventors: Takeshi Yagi, Musashino (JP); Daiki Chiba, Musashino (JP); Kazunori Kamiya, Musashino (JP); Tohru Sato, Musashino (JP); Kensuke Nakata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 277 days.

(21) Appl. No.: 15/120,970

(22) PCT Filed: Mar. 16, 2015

(86) PCT No.: PCT/JP2015/057757
§ 371 (c)(1),
(2) Date: Aug. 23, 2016

(87) PCT Pub. No.: WO2015/141640
PCT Pub. Date: Sep. 24, 2015

(65) Prior Publication Data
US 2016/0366171 A1    Dec. 15, 2016

(30) Foreign Application Priority Data
Mar. 19, 2014    (JP) .................. 2014-056664

(51) Int. Cl.
H04L 29/06    (2006.01)
H04L 12/64    (2006.01)
G06F 21/56    (2013.01)

(52) U.S. Cl.
CPC ........ *H04L 63/1425* (2013.01); *G06F 21/563* (2013.01); *H04L 12/6418* (2013.01);
(Continued)

(58) Field of Classification Search
CPC .................................................. H04L 63/1425
(Continued)

(56) References Cited

U.S. PATENT DOCUMENTS

| 7,558,796 B1 * | 7/2009 | Bromwich ........ G06F 17/30386 |
| 9,043,905 B1 * | 5/2015 | Allen .................. H04L 63/1441 726/22 |

(Continued)

FOREIGN PATENT DOCUMENTS

| JP | 2005-316779 A | 11/2005 |
| JP | 2012-14660 A | 1/2012 |

(Continued)

OTHER PUBLICATIONS

Roberto Perdisci, et al., "Behavioral Clustering of HTTP-Based Malware and Signature Generation Using Malicious Network Traces", NSDI, pp. 1-14, (Apr. 2010).

(Continued)

*Primary Examiner* — Khalil Naghdali
(74) *Attorney, Agent, or Firm* — Oblon, McClelland, Maier & Neustadt, L.L.P.

(57) ABSTRACT

An extraction criterion determination method performed by an extraction criterion determination apparatus includes collecting a log information entry that is in a predetermined period of time and determined to be a specific communication, extracting a communication satisfying a criterion used
(Continued)

to extract the specific communication from log information entries from the collected log information entries with reference to a storage unit storing an extraction criterion in which the criterion is defined, determining to adopt the extraction criterion when the ratio of the specific communications to the extracted communications is larger than or equal to a threshold, and performing a control to output the adopted extraction criterion.

8 Claims, 9 Drawing Sheets

(52) U.S. Cl.
CPC ........ H04L 63/145 (2013.01); H04L 63/1416 (2013.01); H04L 63/1458 (2013.01); *G06F 2221/2101* (2013.01)

(58) Field of Classification Search
USPC .......................................................... 726/23
See application file for complete search history.

(56) References Cited

U.S. PATENT DOCUMENTS

| | | | |
|---|---|---|---|
| 9,680,938 B1* | 6/2017 | Gil | H04L 67/142 |
| 2005/0086538 A1 | 4/2005 | Kubota | |
| 2007/0071081 A1* | 3/2007 | Nemoto | H04B 17/26 375/224 |
| 2012/0278886 A1* | 11/2012 | Luna | G06F 21/552 726/22 |
| 2013/0031599 A1* | 1/2013 | Luna | G06F 21/554 726/1 |
| 2013/0160119 A1* | 6/2013 | Sartin | G06F 21/552 726/23 |
| 2015/0082430 A1* | 3/2015 | Sridhara | G06F 21/566 726/23 |
| 2015/0317475 A1* | 11/2015 | Aguayo Gonzalez | G06F 21/55 726/23 |
| 2015/0358344 A1* | 12/2015 | Mumcuoglu | G06F 21/552 726/23 |
| 2015/0378803 A1* | 12/2015 | Otsuka | G06F 11/079 714/37 |
| 2016/0004733 A1* | 1/2016 | Cao | G06F 11/0709 707/755 |
| 2016/0197952 A1* | 7/2016 | Fujimoto | H04L 63/1416 726/23 |
| 2016/0359808 A1* | 12/2016 | Lopez | H04L 63/0218 |
| 2016/0366171 A1* | 12/2016 | Yagi | H04L 63/1458 |
| 2016/0370959 A1* | 12/2016 | Wu | G06F 9/445 |

FOREIGN PATENT DOCUMENTS

| | | |
|---|---|---|
| JP | 2012-89057 A | 5/2012 |
| WO | 03/100619 A1 | 12/2003 |

OTHER PUBLICATIONS

Yinglian Xie, et al., "Spamming Botnets: Signatures and Characteristics", Proceedings of the ACM SIGCOMM 2008 Conference on Data Communication—SIGCOMM' 08, vol. 38, No. 4, Total 12 Pages, (Aug. 2008).

International Search Report dated Jun. 16, 2015 in PCT/JP15/057757 Filed Mar. 16, 2015.

* cited by examiner

| NUMBER | COMMUNICATION DATE AND TIME | COMMUNICATION SOURCE IP ADDRESS | COMMUNICATION DESTINATION IP ADDRESS | TRANSMITTING END PORT | DESTINATION PORT | ... |
|---|---|---|---|---|---|---|
| 1 | 20131211101330 | 120.2.13.3 | 119.64.27.1 | 80 | 80 | ... |
| 2 | 20131211101330 | 10.0.0.1 | 234.33.242.22 | 50032 | 60320 | ... |
| 3 | 20131211101331 | 69.3.14.2 | 192.168.1.1 | 443 | 443 | ... |
| ... | ... | ... | ... | ... | ... | ... |
| 231 | 20131212235101 | 122.23.242.1 | 111.99.234.2 | 23 | 23 | ... |
| 232 | 20131212235105 | 241.22.2.145 | 42.29.1.249 | 53 | 53 | ... |
| 233 | 20131212235551 | 114.55.65.3 | 222.1.45.6 | 8080 | 8080 | ... |
| ... | ... | ... | ... | ... | ... | ... |

FIG.4

| NUMBER | COMMUNICATION SOURCE IP ADDRESS | COMMUNICATION DESTINATION IP ADDRESS | NUMBER OF COMMUNICATIONS | COMMUNICATION INTERVAL (AVERAGE) | COMMUNICATION INTERVAL (STANDARD DEVIATION) | AMOUNT OF TRAFFIC OF COMMUNICATIONS (AVERAGE) | AMOUNT OF TRAFFIC OF COMMUNICATIONS (STANDARD DEVIATION) | ... |
|---|---|---|---|---|---|---|---|---|
| 1 | 192.168.1.1 | * | 20 | 60 | 0 | 245 | 0 | ... |
| 2 | 69.3.14.2 | 111.99.234.2 | 33 | 45 | 13 | 532 | 34 | ... |
| 3 | 119.64.27.1 | * | 1992 | 524 | 242 | 624 | 0 | ... |
| 4 | 122.23.242.1 | 42.29.1.249 | 344 | 234 | 24 | 1423 | 442 | ... |
| 5 | 241.22.2.145 | 222.1.45.6 | 20 | 120 | 2 | 541 | 0 | ... |
| 6 | 222.1.45.6 | * | 23 | 346 | 93 | 673 | 356 | ... |
| 7 | 114.55.65.3 | * | 56 | 265 | 23 | 367 | 101 | ... |
| ... | ... | ... | ... | ... | ... | ... | ... | ... |

FIG.5

| NUMBER | COMMUNICATION SOURCE IP ADDRESS | COMMUNICATION DESTINATION IP ADDRESS | NUMBER OF COMMUNICATIONS | COMMUNICATION INTERVAL (AVERAGE) | COMMUNICATION INTERVAL (STANDARD DEVIATION) | AMOUNT OF TRAFFIC OF COMMUNICATIONS (AVERAGE) | AMOUNT OF TRAFFIC OF COMMUNICATIONS (STANDARD DEVIATION) | ... |
|---|---|---|---|---|---|---|---|---|
| 1 | 192.168.1.1 | * | 20 | 60 | 0 | 245 | 0 | ... |
| 2 | 69.3.14.2 | 111.99.234.2 | 33 | 45 | 13 | 532 | 34 | ... |
| 3 | 119.64.27.1 | * | 1992 | 524 | 242 | 624 | 0 | ... |
| 4 | 122.23.242.1 | 42.29.1.249 | 344 | 234 | 24 | 1423 | 442 | ... |
| 5 | 241.22.2.145 | 222.1.45.6 | 20 | 120 | 2 | 541 | 0 | ... |
| 6 | 222.1.45.6 | * | 23 | 346 | 93 | 673 | 356 | ... |
| 7 | 114.55.65.3 | * | 56 | 265 | 23 | 367 | 101 | ... |
| ... | ... | ... | ... | ... | ... | ... | ... | ... |

FIG.6

| EXTRACTION CRITERION | |
|---|---|
| PROCEDURE 1 | CRITERION 1 |
| PROCEDURE 2 | CRITERION 2 |
| ⋮ | ⋮ |
| PROCEDURE x | CRITERION 3 |
| PROCEDURE (x+1) | CRITERION 4 |

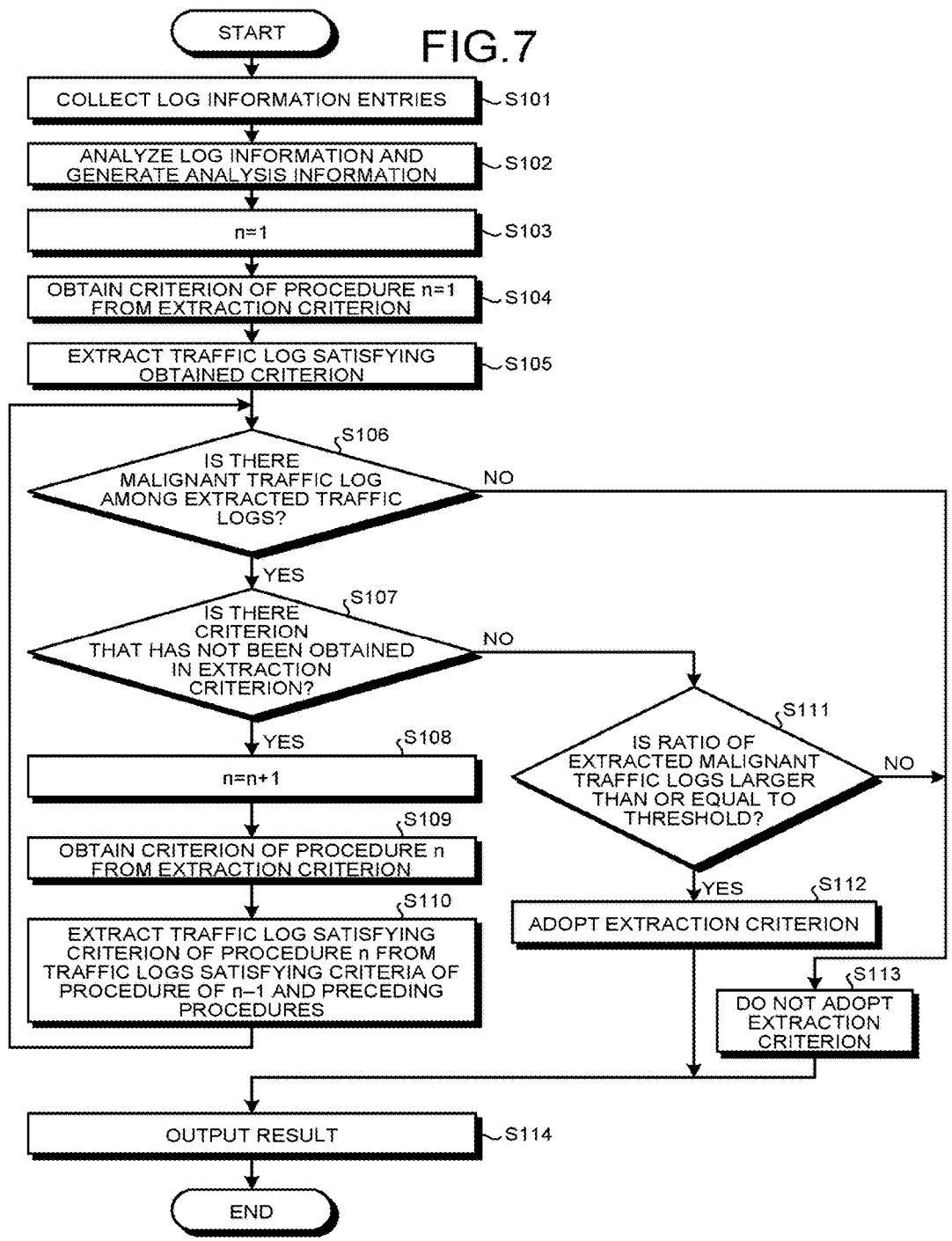

FIG.8

| EXTRACTION CRITERION a | |
|---|---|
| PROCEDURE 1 | NUMBER OF COMMUNICATIONS IS LARGER THAN OR EQUAL TO 300 |

FIG.9

| EXTRACTION CRITERION b | |
|---|---|
| PROCEDURE 1 | THERE ARE TWO OR MORE COMMUNICATION DESTINATION IP ADDRESSES OF COMMUNICATION SOURCE IP ADDRESS |
| PROCEDURE 2 | NUMBER OF COMMUNICATIONS IS LARGER THAN OR EQUAL TO 300 |

FIG.10

| EXTRACTION CRITERION c | |
|---|---|
| PROCEDURE 1 | COMMUNICATION INTERVAL (STANDARD DEVIATION) IS SMALLER THAN OR EQUAL TO FIVE |
| PROCEDURE 2 | THERE ARE TWO OR MORE COMMUNICATION DESTINATION IP ADDRESSES OF COMMUNICATION SOURCE IP ADDRESS |

EXTRACTION CRITERION DETERMINATION METHOD, COMMUNICATION MONITORING SYSTEM, EXTRACTION CRITERION DETERMINATION APPARATUS AND EXTRACTION CRITERION DETERMINATION PROGRAM

FIELD

The embodiments of the present invention relate to an extraction criterion determination method, a communication monitoring system, an extraction criterion determination apparatus, and an extraction criterion determination program.

BACKGROUND

With the widespread use of the Internet, cyber attacks including Distributed Denial of Service (DDoS) attacks and the transmission of spam emails rapidly increase. Most of the attacks are caused by malicious software called malware. Attackers illegally control ordinary users' terminals or servers by making malware infect the terminals or servers and controlling the malware so as to collect information or perform a new attack. These attacks have become a social problem. Thus, the need to take measures against cyber attacks centered on malware infection has become urgent.

As the measures against cyber attacks, a measure on a terminal and a measure on a network have been discussed. As the measure on a terminal, a technique using anti-virus software, and a technique using a host-based Intrusion Detection System (IDS) or a host-based Intrusion Prevention System (IPS) have been discussed. In these techniques, the measures are taken by software installation on a terminal. On the other hand, as the measure on a network, a technique using a network-based IDS or IPS, and a technique using a Firewall or a Web Application Firewall (WAF) have been discussed. In these techniques, inspection devices are arranged on the connecting parts of the network. Furthermore, for example, Security Information and Event Management (SIEM) service that detects the trace of an attack by analyzing the log of the terminal or device has been provided. All the methods take measures based on the prepared information about the characteristics of known attacks.

To collect the information about the communication of such an attack in the techniques for the measures, a decoy system called honeypot is used to collect the other end and contents of the communication of a malware infection attack or another cyber attack. Alternatively, a malware analysis system called sandbox is used to make malware actually operate in order to collect the other end and contents of the communication of the malware. Alternatively, an anti-spam-email system or an anti-DDoS system is used to collect the other end and contents of the communication determined to be an attack. Furthermore, the characteristic information including the Uniform Resource Locator (URL) of the destination or the Internet Protocol (IP) address of the destination is extracted from the information about the communications associated with the attack. In such extraction, an existing technology such as machine learning is often used to automatically extract the characteristic information from the information about the communications associated with the attack. In such a technology, the information about the communications associated with the attack is classified into predetermined items including the date and time, the IP address of the other end of the communication, the port number used for the communication, the number of communications in a given period of time, and the amount of traffic of communications. Each of the items is aggregated. In the aggregate, observed values are often input as the date and time or the port number. On the other hand, statistics including the average value, the standard deviation, and the variance are sometimes input as the number of communications or the amount of traffic of communications. After the calculation of the aggregates, for example, a search for a statistical outlier is conducted. When an outlier is found in an item, the communication associated with the outlier is determined to be an attack. Meanwhile, the outlier of the item is determined to be the rule for searching for an attack. The outlier of the item is also specified as the characteristic information about an attack. Furthermore, for example, the IP addresses associated with found attacks are blacklisted. The blacklist may be used as the characteristic information used to determine the communication with the IP address as an attack. Note that the URLs of the other ends may also be blacklisted. In such as case, the URL may be blacklisted with regular expression. Note that, when the traffic logs or alerts are collected from different devices or different types of software in order for the extraction of the information about the other ends or contents of the communications from the traffic logs or alerts, the notations to represent the items vary depending on the devices or the types of software. However, technologies to convert the log information entries represented in different notations into the log information entries represented in a unified notation in order for the aggregate of the information items have been spread as SIEM products.

CITATION LIST

Patent Literature

Non Patent Literature 1: R. Perdisci, W. Lee, and N. Feamster, "Behavioral Clustering of HTTP-Based Malware and Signature Generation Using Malicious Network Traces." NSDI, p. 26, April 2010.

Non Patent Literature 2: Y. Xie, F. Yu, K. Achan, R. Panigrahy, G. Hulten, and I. Osipkov, "Spamming Botnets: Signatures and Characteristics," Proceedings of the ACM SIGCOMM 2008 conference on Data communication—SIGCOMM'08, vol. 38, no. 4, p. 171, August 2008.

SUMMARY

Technical Problem

However, false detection in which a communication unrelated to an attack, namely, a benign communication is wrongly detected as a communication related to an attack may occur in the methods described above.

For example, when the information about a communication related to an attack is collected and a benign communication is collected together with the information, the characteristic information about the benign communication may wrongly be extracted and the rule used to extract the characteristic information about the benign communication may wrongly be determined to be a rule for identifying a malignant traffic log in the methods. For example, malware often accesses an authorized Website in order to obstruct the analysis or check the connection to the Internet. This may cause a normal access to the authorized Website to mix with the other ends or contents of the communication with the malware collected by the sandbox. As a method for scanning the contents of the communication associated with an attack, a method in which the information on the Internet is collected to examine the reputation of the other end of the communication, and a method in which the collected contents of the communication are reproduced with anti-virus software, IDS, IPS, or WAF in order for the inspection of whether the communication is determined to be an attack have been discussed. However, a failure in detection or false detection may occur in either of the methods. This makes it difficult to automatically and accurately extract the information about the communication of an attack from the information about the communications related to the attack. Such a failure in detection is sometimes considered to be allowable if the failure means that it may also be impossible to detect the attack in any other methods. On the other hand, it is necessary to decrease false detection as much as possible in order to avoid the operation cost of measures or investigations after the detection. In light of the foregoing, currently, analysts manually analyze the contents of communications in most cases in order to specify a rule for finding an attack and extract the characteristic information about the attack. As a result, the extraction of the characteristic information about an attack requires temporal and labor costs. These costs have caused a large bottleneck for security vendors or service providers especially while attacks have varied and diversified in these years.

The present invention was developed in order that the problems on the conventional technologies may be solved, and an objective of the present invention is to decrease false detection.

Solution to Problem

An extraction criterion determination method performed by an extraction criterion determination apparatus, the method includes: collecting a log information entry of a communication performed in a predetermined period of time, the log information entry being determined to be a specific communication; extracting a communication satisfying a criterion from the collected log information entries with reference to a storage unit storing an extraction criterion, the criterion being used to extract the specific communication from the log information entries, the criterion being defined in the extraction criterion; determining to adopt the extraction criterion when a ratio of the specific communications to the extracted communications is larger than or equal to a threshold; and performing a control to output the adopted extraction criterion.

Advantageous Effects of Invention

An aspect of the technology disclosed herein brings about an effect of decreasing false detection.

BRIEF DESCRIPTION OF DRAWINGS

FIG. 4 is a diagram of exemplary information stored in an analysis information storage unit according to the first embodiment.

FIG. 5 is a diagram of exemplary information stored in the analysis information storage unit according to the first embodiment.

FIG. 6 is a diagram of exemplary information stored in an extraction criterion storage unit according to the first embodiment.

FIG. 7 is an explanatory flowchart of a process that the information collection and delivery server according to the first embodiment performs.

FIG. 8 is an explanatory diagram of exemplary application of the information collection and delivery server according to the first embodiment.

FIG. 9 is an explanatory diagram of exemplary application of the information collection and delivery server according to the first embodiment.

FIG. 10 is an explanatory diagram of exemplary application of the information collection and delivery server according to the first embodiment.

DESCRIPTION OF EMBODIMENTS

The embodiments of the extraction criterion determination method, communication monitoring system, extraction criterion determination apparatus, and extraction criterion determination program according to the present invention will be described in detail hereinafter with reference to the appended drawings. Note that the present invention is not limited to the embodiments.

First Embodiment (Network Structure to which Information Collection and Delivery Server is Applied)

Figure 1:
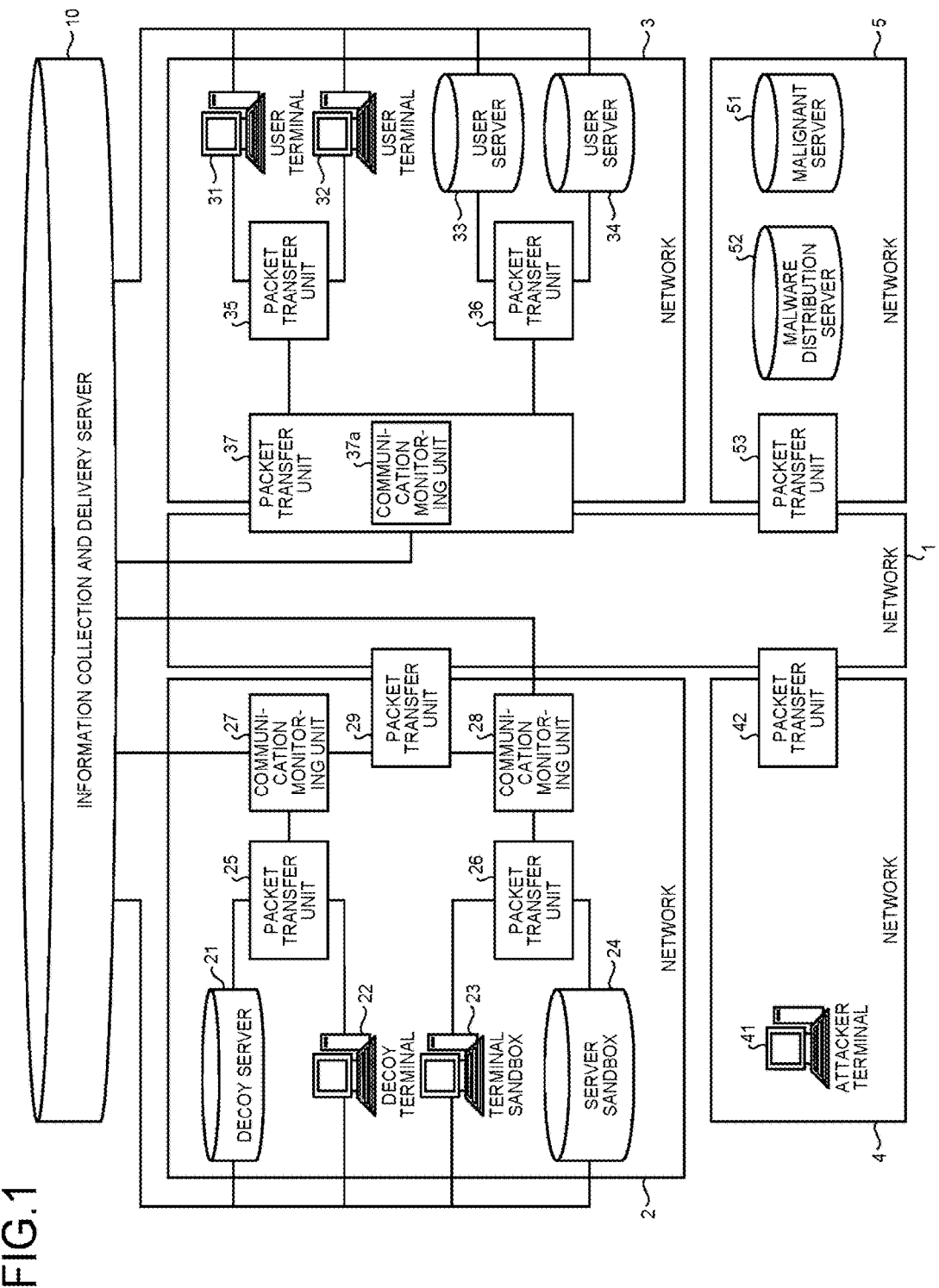
FIG. 1 is a diagram of an exemplary network structure to which an information collection and delivery server according to a first embodiment is applied.

FIG. 1 is a diagram of an exemplary network structure to which an information collection and delivery server according to a first embodiment is applied.

As illustrated in FIG. 1, a network 1 includes networks 2 to 5. The network 1 can be a broad network such as the Internet, or a relatively narrow network such as a corporate network.

The network 1 is connected to the network 2 via a packet transfer unit 29. The network 1 is connected to the network 3 via a packet transfer unit 37. The network 1 is connected to the network 4 via a packet transfer unit 42. The network 1 is connected to the network 5 via a packet transfer unit 53. The servers and terminals in the network 2 are connected via packet transfer units 25 and 26, respectively. The servers and terminals in the network 3 are connected via packet transfer units 35 and 36, respectively.

A decoy server 21, a decoy terminal 22, a terminal sandbox 23, and a server sandbox 24 collect specific types of (hereinafter properly referred to as "malignant") communications such as a Distributed Denial of Service (DDoS) attack and spam transmission using malware that is an attack tool program used for unauthorized access to a server or a terminal. The decoy server 21, decoy terminal 22, terminal sandbox 23, and server sandbox 24 store the log information about the collected malignant communication in a predetermined storage area.

For example, an open-source honey pot or a uniquely developed honey pot can be applied as the decoy server 21 and the decoy terminal 22. For example, open-source software or a uniquely developed sandbox can be applied as the terminal sandbox 23 and the server sandbox 24.

User terminals 31 and 32, and user servers 33 and 34 communicate with each other via the networks 1 to 5. The user terminals 31 and 32, and the user servers 33 and 34 are objects used to confirm an attack from an attacker terminal 41 or a malignant server 51, and objects to be protected by a filtering process. Attack detection software, which detects an attack, is applied to the user terminals 31 and 32, and the user servers 33 and 34. The user terminals 31 and 32, and the user servers 33 and 34 store the log information entry of the detected communication in a predetermined storage area.

The attacker terminal 41 attacks the user terminals 31 and 32, and the user servers 33 and 34. The malignant server 51 transfers data to another server so as to attack the accessed user terminals 31 and 32. A malware distribution server 52 distributes the malware to the accessed user terminals 31 and 32.

The packet transfer units 25, 26, 29, 35 to 37, 42, and 53 are devices including a switch and a router, and have, for example, a switch function, a router function, a port forwarding function, a Hypertext Transfer Protocol (HTTP) transfer function. The packet transfer units 25, 26, 29, 35 to 37, 42, and 53 determine a transfer destination with reference to a MAC address, an IP address, a port number, or the information in a header such as an HTTP header so as to output a packet to the destination.

Communication monitoring units 27 and 28 are devices arranged in the network 2. A communication monitoring unit 37a is placed as a function of the packet transfer unit 37. The communication monitoring units 27, 28, and 37a use a security appliance, proxy, anti-virus software so as to monitor the information or packet payload used for transfer.

The communication monitoring units 27, 28, and 37a store the characteristic information used to identify a malignant communication so as to detect a communication matching the characteristic information and block the detected communication. Meanwhile, the communication monitoring units 27, 28, and 37a transfer the detected communication to an external terminal (not illustrated) to cause the external terminal to quarantine the detected communication. Meanwhile, the communication monitoring units 27, 28, and 37a block the detected communication and transmit the detected communication to an information collection and delivery server 10. Meanwhile, the communication monitoring units 27, 28, and 37a store the log information in the traffic of the communication.

The information collection and delivery server 10 collects the log information entries of the communications stored in each of the communication monitoring units 27, 28, and 37a, the decoy server 21, the decoy terminal 22, the terminal sandbox 23, the server sandbox 24, the user terminals 31 and 32, and the user servers 33 and 34. The information collection and delivery server 10 extracts new characteristic information by analyzing the collected information entries, and delivers the extracted new characteristic information to each of the communication monitoring units 27, 28, and 37a, the decoy server 21, the decoy terminal 22, the terminal sandbox 23, the server sandbox 24, the user terminals 31 and 32, and the user servers 33 and 34. For example, the information collection and delivery server 10 is provided by a security vendor. Note that the information collection and delivery server 10 will be described in detail below.

(Configuration of Information Collection and Delivery Server)

Figures 2, 3:
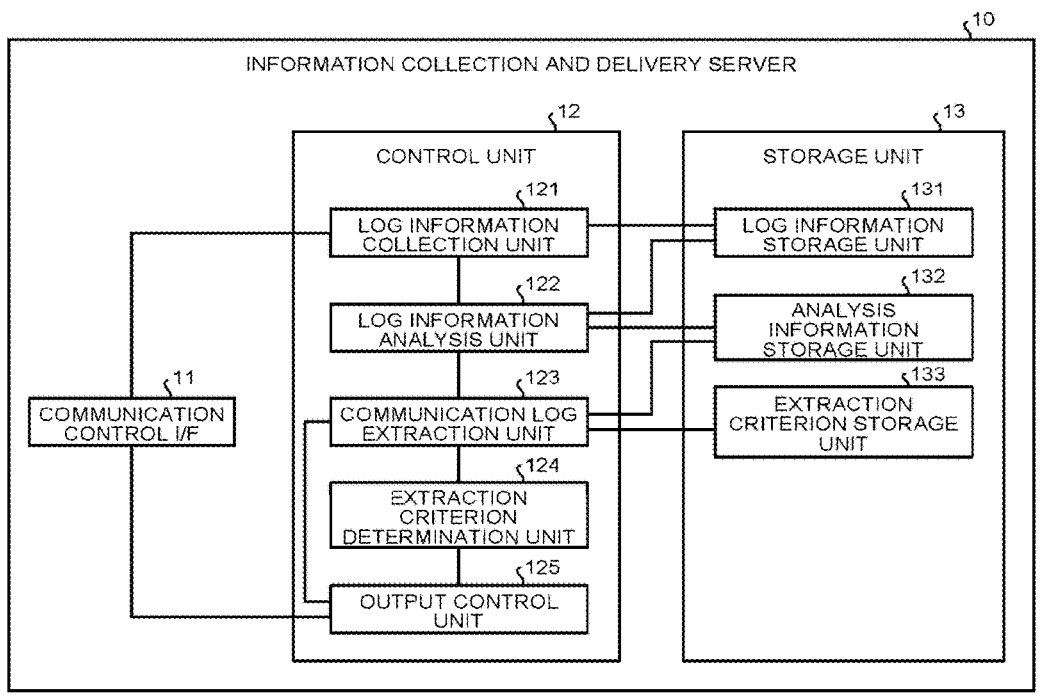
FIG. 2 is a block diagram of the configuration of the information collection and delivery server according to the first embodiment.
FIG. 3 is a diagram of exemplary information stored in a log information storage unit according to the first embodiment.

FIG. 2 is a block diagram of the configuration of the information collection and delivery server 10 according to the first embodiment. As illustrated in FIG. 2, the information collection and delivery server 10 includes a communication control I/F 11, a control unit 12, and a storage unit 13. The process that each of the included units performs will be described below.

The communication control I/F 11 controls the communications associated with various types of information that each of the communication monitoring units 27, 28, and 37a, the decoy server 21, the decoy terminal 22, the terminal sandbox 23, the server sandbox 24, the user terminals 31 and 32, and the user servers 33 and 34 exchange. Specifically, the communication control I/F 11 receives the log information entries of the communications from each of the communication monitoring units 27, 28, and 37a, the decoy server 21, the decoy terminal 22, the terminal sandbox 23, the server sandbox 24, the user terminals 31 and 32, and the user servers 33 and 34. The communication control I/F 11 transmits the characteristic information to each of the communication monitoring units 27, 28, and 37a, the decoy server 21, the decoy terminal 22, the terminal sandbox 23, the server sandbox 24, the user terminals 31 and 32, and the user servers 33 and 34.

The storage unit 13 stores data necessary for various processes that the control unit 12 performs and the results of the various processes performed by the control unit 12. The storage unit 13 includes a log information storage unit 131, an analysis information storage unit 132, and an extraction criterion storage unit 133. The storage unit 13 is, for example, a semiconductor memory device such as a Random Access Memory (RAM), a Read Only Memory (ROM), or a Flash Memory, a hard disk, or an optical hard disk.

The log information storage unit 131 stores the log information entries of communications. For example, the log information storage unit 131 stores the log information entries collected in a predetermined period of time by a log information collection unit 121. For example, a log information analysis unit 122 refers to the log information storage unit 131.

FIG. 3 is a diagram of exemplary information stored in the log information storage unit 131 according to the first embodiment. As illustrated in FIG. 3, for example, the log information storage unit 131 stores a "number", a "communication date and time", a "communication source IP address", a "communication destination IP address", a "transmitting end port", and a "destination port" while linking them to each other. The "number" is the information used to uniquely identify a communication between the communication source and the communication destination. The "communication date and time" is the information indicating the date and time when the communication is performed. The "communication source IP address" is the information indicating the IP address of the communication source. The "communication destination IP address" is the information indicating the IP address of the communication destination. The "transmitting end port" is the information indicating the port number of the transmitting end. The "destination port" is the information indicating the port number of the destination.

Note that, the information illustrated in FIG. 3 is merely an example. For example, the log information storage unit 131 can store the information different from the log information described above as log information. This is because the log information that the log information collection unit 121 can collect varies depending on the software or the network device. For example, the log information storage unit 131 can store data in a pcap format, or data of an HTTP header collected in a proxy server. The log information storage unit 131 can store the number of frames or packets of each IP address or each port number that can normally be observed in a network device such as a router, or a switch. Alternatively, the log information storage unit 131 can record data of each communication, data of each received frame or packet, or data in a multi session format.

The analysis information storage unit 132 stores the analysis information. For example, the analysis information storage unit 132 stores the analysis information analyzed per communication source IP address by the log information analysis unit 122. For example, a communication log extraction unit 123 refers to the analysis information storage unit 132.

FIG. 4 is a diagram of exemplary information stored in the analysis information storage unit 132 according to the first embodiment. As illustrated in FIG. 4, for example, the "number" in the analysis information storage unit 132 is the information uniquely identifying an analysis information entry. The "communication source IP address" is the information indicating the IP address of the communication source. The "communication destination IP address" is the information indicating the IP address of the communication destination of the communication from the communication source IP address in a predetermined period of time. The "*" in this example means that a plurality of communication destination IP addresses is included in the analysis information entry. The "number of communications" is the information indicating the number of communications from the communication source IP address in a predetermined period of time. The "communication interval (average)" is the information indicating the average value of the intervals of communications from the communication source IP address in a predetermined period of time. The "communication interval (standard deviation)" is the information indicating the standard deviation of the intervals of communications from the communication source IP address in a predetermined period of time. The "the amount of traffic of communications (average)" is the information indicating the average value of the amounts of traffic of communications from the communication source IP address in a predetermined period of time. The "the amount of traffic of communications (standard deviation)" is the information indicating the standard deviation of the amounts of traffic of communications from the communication source IP address in a predetermined period of time.

Note that, in the present embodiment, each entry (record) in the analysis information storage unit 132 is referred to as a "traffic log", or a "communication log". Among the traffic logs, a traffic log determined to be a malignant communication is referred to as a "malignant traffic log" while a traffic log determined to be a benign communication is referred to as a "benign traffic log". The traffic log is an exemplary "communication".

The information illustrated in FIG. 4 is merely an example. For example, the analysis information storage unit 132 can store information different from the analysis information described above as analysis information. For example, the analysis information storage unit 132 can store not only the average values and the standard deviation values but also another statistical value such as variance. Alternatively, for example, the analysis information storage unit 132 can store not only the statistical values but also the information such as a first observation date and time, a last observation date and time, a communication protocol, a communication destination URL, or the text described in data.

When the log information collection unit 121 to be described below collects the log information entry of a communication determined to be a malignant communication in this example, the log information storage unit 131 and analysis information storage unit 132 according to the first embodiment store the information indicating the malignant communication. For example, the analysis information storage unit 132 stores an information entry indicating a malignant traffic log and an information entry indicating a benign traffic log.

FIG. 5 is a diagram of exemplary information stored in the analysis information storage unit 132 according to the first embodiment. In the example illustrated in FIG. 5, malignant traffic logs are illustrated as white entries (without hatching) while the benign traffic logs are illustrated as shaded entries. In other words, the analysis information storage unit 132 stores that the traffic logs of the numbers "1", "3", and "5" are malignant traffic logs. On the other hand, the analysis information storage unit 132 stores that the traffic logs of the numbers "2", "4", "6" and "7" are benign traffic logs.

Note that, although shaded patterns on the entries are used to illustrate the information entries of the malignant communications, the analysis information storage unit 132 actually stores an information entry of a malignant communication as an information flag indicating a malignant communication, or as a table storing an information entry indicating a malignant communication. When the analysis information storage unit 132 uses an information flag to store the information indicating a malignant communication, the analysis information storage unit 132 can individually use, for example, an information flag indicating a malignant traffic log and an information flag indicating a benign traffic log, or can use an information flag in which a malignant traffic log or a benign traffic log can be identified with the ON/OFF of the information flag.

For the sake of description, an example in which the analysis information storage unit 132 stores the information entries indicating malignant communications has been described above. However, the log information storage unit 131 similarly stores the information entries indicating the malignant communications. When the log information collection unit 121 collects a log information entry that has not been determined to be a malignant communication, the log information storage unit 131 and analysis information storage unit 132 do not store the information indicating the malignant communication.

The extraction criterion storage unit 133 stores extraction criterion for extracting the specific types of communications from the log information entries of the communications. For example, the extraction criterion storage unit 133 is previously defined by the operator who operates the information collection and delivery server 10. For example, the communication log extraction unit 123 refers to the extraction criterion storage unit 133.

FIG. 6 is a diagram of exemplary information stored in the extraction criterion storage unit 133 according to the first embodiment. As illustrated in FIG. 6, for example, the extraction criterion storage unit 133 stores, as the extraction criterion, a plurality of "procedures" and a plurality of "criteria" while linking the procedures and criteria, respectively. The "procedures" indicate the order of extraction using the criteria. The "criteria" are the information used to extract a malignant communication from the log information entries. For example, in a process to be described below, the traffic logs satisfying the criteria are extracted, respectively, in the order of the procedures. In other words, each criterion includes the range of objects to be processed with the next procedure. As described above, the extraction criterion storage unit 133 stores a plurality of criteria and the procedures indicating the order of the criteria while linking the criteria and procedures as an extraction criterion.

Note that the information illustrated in FIG. 6 is merely an example. For example, the extraction criterion storage unit 133 can store a plurality of extraction criteria. Alternatively, the extraction criterion storage unit 133 can store only a criterion in the stored extraction criterion. Specific examples of the information stored in the extraction criterion storage unit 133 will be described below with reference to FIGS. 8 to 10.

As described above, the storage unit 13 stores various types of information. Note that, during the processes for extraction, an item can be added to the various types of information stored in the storage unit 13, or the numerical values in the information can be recalculated and updated.

The control unit 12 includes an internal memory so as to store a control program, a program defining, for example, the procedures of various processes, and necessary data. The control unit 12 includes a log information collection unit 121, a log information analysis unit 122, a communication log extraction unit 123, an extraction criterion determination unit 124, and an output control unit 125. The control unit 12 is, for example, an integrated circuit such as an Application Specific Integrated Circuit (ASIC) or a Field Programmable Gate Array (FPGA), or an electronic circuit such as a Central Processing Unit (CPU) or a Micro Processing Unit (MPU).

The log information collection unit 121 collects the log information entries of communications in a predetermined period of time. For example, the log information collection unit 121 collects the log information entries of the communications from each of the communication monitoring units 27, 28, and 37*a*, the decoy server 21, the decoy terminal 22, the terminal sandbox 23, the server sandbox 24, the user terminals 31 and 32, and the user servers 33 and 34. Then, the log information collection unit 121 numbers the collected log information entries in order of communication date and time, and stores the numbered log information entries in the log information storage unit 131.

For example, the log information collection unit 121 collects data in a pcap format, the syslog information of the server, data of an HTTP header collected in the proxy server, and the number of frames or packets of each IP address or each port number observed in a network device, and stores the data, information and number in the log information storage unit 131. Note that, although the items and notations of the collected log information entries vary depending on the network device or software, technologies to convert the log information entries described in different notations into the log information entries described in a unified notation have been spread as SIEM products in these years.

The log information collection unit 121 collects a log information entry already determined to be a malignant communication. For example, when the decoy server 21, the decoy terminal 22, the terminal sandbox 23, the server sandbox 24, the user terminal 31 or 32, or the user server 33 or 34 detects an attack, the log information collection unit 121 collects the log information entry of the detected communication as the log information entry of a malignant communication. Subsequently, the log information collection unit 121 numbers the collected log information entries in order of communication date and time, and stores the numbered log information entries together with the information indicating the malignant communications into the log information storage unit 131 (see FIG. 5). Meanwhile, the log information collection unit 121 collects, as the log information entry of a benign communication, a log information entry of the communication that the decoy server 21, the decoy terminal 22, the terminal sandbox 23, the server sandbox 24, the user terminal 31 or 32, or the user server 33 or 34 does not detect as an attack. Subsequently, the log information collection unit 121 numbers the collected log information entries in order of communication date and time, and stores the numbered log information entries together with the information indicating the benign communications into the log information storage unit 131 (see FIG. 5).

A log information entry of a communication, which is not detected as an attack, is collected as the log information entry of a benign communication in this example. Note that, however, the embodiment is not limited to the example. For example, the log information collection unit 121 can collect the log information entries of the communications that are determined to be benign communications after the process for determining whether the communication is a benign communication, separately from the process for determining a malignant communication. In other words, the log information collection unit 121 can collect the log information entries that are determined to be benign communications, or can collect a communication that is not a malignant communication as the log information of a benign communication even when the communication has not been determined to be a benign communication. In other words, the log information collection unit 121 collects at least a log information entry of a communication that is determined to be a malignant communication.

Furthermore, in this example, the log information collection unit 121 automatically collects log information entries from the decoy server 21, the decoy terminal 22, the terminal sandbox 23, the server sandbox 24, the user terminals 31 and 32, and the user servers 33 and 34. Note that, however, the embodiment is not limited to the example. For example, the log information collection unit 121 can collect a log information entry by receiving the registration of the log information entry that the operator manually performs. In this example, the information collection and delivery server 10 does not need to be connected to the decoy server 21, the decoy terminal 22, the terminal sandbox 23, the server sandbox 24, the user terminals 31 and 32, and the user servers 33 and 34. Alternatively, the log information collection unit 121 can collect a log information entry that has not been determined to be a malignant communication.

The log information analysis unit 122 analyzes the log information. For example, when the log information storage unit 131 is registered, the log information analysis unit 122 obtains log information entries in a predetermined period of time from the log information storage unit 131. Subsequently, the log information analysis unit 122 analyzes the obtained log information entries by the communication source IP address, and generates analysis information. Then, the log information analysis unit 122 stores the generated analysis information into the analysis information storage unit 132.

For example, the log information analysis unit 122 aggregates the communication destination IP addresses of each communication source IP address. When there is a communication destination IP address, the log information analysis unit 122 registers the IP address on the analysis information storage unit 132. On the other hand, when there is a plurality of communication destination IP addresses, the log information analysis unit 122 registers "*" on the analysis information storage unit 132. For example, the log information analysis unit 122 counts the number of communications of each communication source IP address, and registers the counted value on the analysis information storage unit 132. Meanwhile, the log information analysis unit 122 calculates various statistical values (for example, the communication interval (average), communication interval (standard deviation), the amount of traffic of communications (average), and the amount of traffic of communications (standard deviation)) of each communication source IP address, and registers the calculated values on the analysis information storage unit 132. Note that the analysis method that the log information analysis unit 122 performs is, for example, previously set by the operator.

The communication log extraction unit 123 extracts a communication satisfying each criterion from the collected log information entries with reference to the extraction criterion storage unit 133. For example, when analysis information is stored in the analysis information storage unit 132, the communication log extraction unit 123 obtains the criterion of a procedure 1 with reference to the extraction criterion storage unit 133. Then, the communication log extraction unit 123 extracts the traffic logs satisfying the obtained criterion from the analysis information. Then, the communication log extraction unit 123 determines whether there is a malignant traffic log among the extracted traffic logs.

When there is a malignant traffic log, the communication log extraction unit 123 repeats the process described above until there is no criterion that has not been obtained yet in the extraction criterion. When there is no criterion that has not been obtained yet in the extraction criterion, the communication log extraction unit 123 transmits the extraction results including the extraction criterion used for the extraction and the information indicating the extracted traffic logs to the extraction criterion determination unit 124. On the other hand, when there is no malignant traffic log, the communication log extraction unit 123 transmits the information indicating that there is no malignant traffic log to the extraction criterion determination unit 124. Note that the communication log extraction unit 123 will be described in detail below with exemplary application.

When the ratio of malignant communications to the extracted communications is larger than or equal to a threshold, the extraction criterion determination unit 124 determines to adopt the extraction criterion. For example, when receiving the extraction results extracted by the communication log extraction unit 123, the extraction criterion determination unit 124 determines whether the ratio of malignant traffic logs to all the extracted traffic logs is larger than or equal to the threshold. In this example, when the ratio is larger than or equal to the threshold, the extraction criterion determination unit 124 determines to adopt the extraction criterion used for the extraction by the communication log extraction unit 123. Then, the extraction criterion determination unit 124 transmits the determined extraction criterion to the output control unit 125. Note that the threshold can previously be set by the operator or mechanically be set by the function.

On the other hand, when the ratio is not larger than or equal to the threshold, or when the extraction criterion determination unit 124 receives the information indicating that there is no malignant traffic log from the communication log extraction unit 123, the extraction criterion determination unit 124 determines not to adopt the extraction criterion. Subsequently, the extraction criterion determination unit 124 transmits the information indicating that the extraction criterion determination unit 124 determines not to adopt the extraction criterion to the output control unit 125. Note that the extraction criterion determination unit 124 will be described in detail below with exemplary application.

The output control unit 125 performs a control to output the adopted result. For example, when receiving the determined extraction criterion from the extraction criterion determination unit 124, the output control unit 125 notifies the operator of the received extraction criterion. On the other hand, for example, when receiving the information indicating that the extracted criterion is not adopted from the extraction criterion determination unit 124, the output control unit 125 notifies the operator of the received information indicating that the extracted criterion is not adopted.

(Process that Information Collection and Delivery Server Performs)

FIG. 7 is an explanatory flowchart of a process that the information collection and delivery server 10 according to the first embodiment performs.

As illustrated in FIG. 7, the log information collection unit 121 collects log information entries that are determined to be a malignant communication (step S101). Subsequently, the log information analysis unit 122 analyzes the log information and generates analysis information (step S102). For example, the log information analysis unit 122 generates the analysis information illustrated in FIG. 5.

Subsequently, the communication log extraction unit 123 sets n=1 as the order of criterion used for extraction (step S103), and obtains the criterion of a procedure n=1 from the extraction criterion (step S104). Then, the communication log extraction unit 123 extracts a traffic log satisfying the obtained criterion from the traffic logs in the analysis information (step S105). Then, the communication log extraction unit 123 determines whether there is a malignant traffic log among the extracted traffic logs (step S106).

When there is a malignant traffic log, (Yes in step S106), the communication log extraction unit 123 determines whether there is a criterion that has not been obtained in the extraction criterion (step S107). When there is a criterion that has not been obtained (Yes in step S107), the communication log extraction unit 123 increments n by one (step S108), and obtains the criterion of a procedure n from the extraction criterion (step S109). Then, the communication log extraction unit 123 extracts a traffic log satisfying the criterion of the procedure n from the traffic logs satisfying the criteria of the procedure of n−1 and preceding procedures (step S110). Then, the communication log extraction unit 123 goes back to the process in step S106.

On the other hand, when there is no criterion that has not been obtained in step S107 (No in step S107), the communication log extraction unit 123 transmits the extraction results to the extraction criterion determination unit 124. The extraction results include at least the extract criterion used for the extraction and the information indicating all the traffic logs extracted in the preceding processes. When receiving the extraction results, the extraction criterion determination unit 124 determines whether the ratio of malignant traffic logs to the extracted traffic logs is larger than or equal to the threshold (step S111). When the ratio is larger than or equal to the threshold (Yes in step S111), the extraction criterion determination unit 124 determines to adopt the extraction criterion used for the extraction by the communication log extraction unit 123 (step S112). The extraction criterion determination unit 124 transmits the determined extraction criterion to the output control unit 125.

On the other hand, when the ratio is not larger than or equal to the threshold (No in step S111), the extraction criterion determination unit 124 determines not to adopt the extraction criterion (step S113). Then, the extraction criterion determination unit 124 transmits the information indicating that the extraction criterion is not adopted to the output control unit 125.

When there is no malignant traffic log in step S106 (No in step S106), the communication log extraction unit 123 transmits the information indicating that there is no malignant traffic log to the extraction criterion determination unit 124. Then, the extraction criterion determination unit 124 determines not to adopt the extraction criterion (step S113). Then, the extraction criterion determination unit 124 transmits the information indicating that the extraction criterion is not adopted to the output control unit 125.

Then, the output control unit 125 outputs the determined result (step S114). For example, when receiving the adopted extraction criterion from the extraction criterion determination unit 124, the output control unit 125 notifies the operator of the received extraction criterion. For example, when receiving the information indicating that the extraction criterion is not adopted from the extraction criterion determination unit 124, the output control unit 125 notifies the operator of the received information indicating that the extraction criterion is not adopted.

(Exemplary Application)

FIGS. 8 to 10 are explanatory diagrams of exemplary application of the information collection and delivery server 10 according to the first embodiment. In this example, a process that the information collection and delivery server 10 performs to determine whether to adopt each of extraction criterion a to c illustrated in FIGS. 8 to 10 using the analysis information illustrated in FIG. 5 will be described. Note that an example in which, when the ratio of malignant traffic logs to all the extracted traffic logs is larger than or equal to 95%, the extraction criterion determination unit 124 determines to adopt the extraction criterion used for the extraction.

With reference to FIG. 8, a process for determining whether to adopt the extraction criterion a will be described. In this example, the communication log extraction unit 123 obtains the criterion of a procedure 1 "the number of communications is larger than or equal to 300" from the extract criterion a in the extraction criterion storage unit 133. Subsequently, the communication log extraction unit 123 extracts a traffic log satisfying the criterion "the number of communications is larger than or equal to 300" from the traffic logs illustrated in FIG. 5. In this example, the traffic logs satisfying the criterion "the number of communications is larger than or equal to 300" are the traffic logs of the numbers "3" and "4". Thus, the communication log extraction unit 123 extracts the traffic logs of the numbers "3" and "4".

Subsequently, the communication log extraction unit 123 determines whether there is a malignant traffic log among the extracted traffic logs. In this example, the number "3" is a malignant traffic log among the extracted traffic logs. Thus, the communication log extraction unit 123 determines whether there is a criterion that has not been obtained in the extraction criterion. In this example, there is no criterion other than the criterion of the procedure 1 in the extraction criterion a of FIG. 8. Thus, the communication log extraction unit 123 transmits the extraction criterion a used for the extraction and the extracted traffic logs of the numbers "3" and "4" to the extraction criterion determination unit 124.

Then, the extraction criterion determination unit 124 determines whether the ratio of malignant traffic logs to all the extracted traffic logs is larger than or equal to 95%. In this example, the number "3" is a malignant traffic log and the number "4" is a benign traffic log in the extracted traffic logs (see FIG. 5). In other words, the ratio of malignant traffic logs to all the extracted traffic logs is 50% in this example. Thus, the extraction criterion determination unit 124 determines not to adopt the extraction criterion a. As described above, it is determined that the extraction criterion a of FIG. 8 is not adopted.

With reference to FIG. 9, a process for determining whether to adopt the extraction criterion b will be described. In this example, the communication log extraction unit 123 obtains the criterion of a procedure 1 "there are two or more communication destination IP addresses of a communication source IP address" from the extraction criterion b in the extraction criterion storage unit 133. Subsequently, the communication log extraction unit 123 extracts a traffic log satisfying the obtained criterion from the traffic logs illustrated in FIG. 5. In this example, the traffic logs satisfying the criterion "there are two or more communication destination IP addresses of a communication source IP address" are the traffic logs of the numbers "1", "3", "6" and "7". Thus, the communication log extraction unit 123 extracts the traffic logs of the numbers "1", "3", "6" and "7".

Subsequently, the communication log extraction unit 123 determines whether there is a malignant traffic log among the extracted traffic logs. The numbers "1" and "3" are malignant traffic logs among the extracted traffic logs. Thus, the communication log extraction unit 123 determines whether there is a criterion that has not been obtained in the extraction criterion. There is a criterion of a procedure 2 in the extraction criterion b of FIG. 9 in this example. Thus, the communication log extraction unit 123 obtains the criterion of the procedure 2 "the number of communications is larger than or equal to 300". Then, the communication log extraction unit 123 extracts a traffic log satisfying the criterion "the number of communications is larger than or equal to 300" from the traffic logs satisfying the criteria of the procedure of n−1 and preceding procedures. In this example, the traffic log of the number "3" is the traffic log satisfying the criterion of the procedure 2 "the number of communications is larger than or equal to 300" among the traffic logs of the numbers "1", "3", "6" and "7" extracted by the criterion of the procedure 1. Thus, the communication log extraction unit 123 extracts the traffic log of the number "3".

In this example, there is not any more criteria in the extraction criterion b. Thus, the communication log extraction unit 123 transmits the extraction criterion b used for the extraction and the extracted traffic log of the number "3" to the extraction criterion determination unit 124.

The extraction criterion determination unit 124 determines whether the ratio of malignant traffic logs to all the extracted traffic logs is larger than or equal to 95%. In this example, the extracted traffic log of the number "3" is a malignant traffic log (see FIG. 5). In other words, the ratio of malignant traffic logs to all the extracted traffic logs is 100% in this example. The extraction criterion determination unit 124 determines to adopt the extraction criterion b. As described above, it is determined that the extraction criterion b of FIG. 9 is adopted. Note that using the extraction criterion b can detect, for example, a Ddos attack.

With reference to FIG. 10, a process for determining whether to adopt the extraction criterion c will be described. In this example, the communication log extraction unit 123 obtains the criterion of a procedure 1 "the communication interval (standard deviation) is smaller than or equal to five" from the extraction criterion c in the extraction criterion storage unit 133. Subsequently, the communication log extraction unit 123 extracts a traffic log satisfying the obtained criterion from the traffic logs illustrated in FIG. 5. In this example, the traffic logs satisfying the criterion "the communication interval (standard deviation) is smaller than or equal to five" are the traffic logs of the numbers "1" and "5". Thus, the communication log extraction unit 123 extracts the traffic logs of the numbers "1" and "5".

Subsequently, the communication log extraction unit 123 determines whether there is a malignant traffic log among the extracted traffic logs. The extracted traffic logs of the numbers "1" and "5" are malignant traffic logs. Thus, the communication log extraction unit 123 determines whether there is a criterion that has not been obtained in the extraction criterion. There is a criterion of a procedure 2 in the extraction criterion c of FIG. 10 in this example. Thus, the communication log extraction unit 123 obtains the criterion of the procedure 2 "there are two or more communication destination IP addresses of a communication source IP address". Then, the communication log extraction unit 123 extracts the traffic log of the number "1" satisfying the criterion "there are two or more communication destination IP addresses of a communication source IP address" among the traffic logs of the numbers "1" and "5" satisfying the criteria of the procedure of n−1 and preceding procedures.

In this example, there are not any more criteria in the extraction criterion c. Thus, the communication log extraction unit 123 transmits the extraction criterion c used for the extraction and the extracted traffic log of the number "1" to the extraction criterion determination unit 124.

The extraction criterion determination unit 124 determines whether the ratio of malignant traffic logs to all the extracted traffic logs is larger than or equal to 95%. In this example, the extracted traffic log of the number "1" is a malignant traffic log (see FIG. 5). In other words, the ratio of malignant traffic logs to all the extracted traffic logs is 100% in this example. The extraction criterion determination unit 124 determines to adopt the extraction criterion c. As described above, it is determined that the extraction criterion c of FIG. 10 is adopted. Note that using the extraction criterion c can identify a traffic log that accesses a plurality of communication destinations at constant intervals, and thus can detect that the behavior of the malware to search for a server that the malware can reach in a communication.

Effect of First Embodiment

As described above, the extraction criterion storage unit 133 in the information collection and delivery server 10 stores the extraction criterion defining a criterion for extracting a malignant communication from the log information entries of communications. The log information collection unit 121 collects a log information entry that is determined to be a malignant communication. The communication log extraction unit 123 refers to the extraction criterion storage unit 133 and extracts a communication satisfying the extraction criterion from the collected log information entries. When the ratio of malignant communications to the extracted communications is larger than or equal to the threshold, the extraction criterion determination unit 124 determines to adopt the extraction criterion. The output control unit 125 performs a control to output the determined results. This enables the information collection and delivery server 10 according to the first embodiment to decrease false detection.

For example, the information collection and delivery server 10 extracts the information entry of a traffic log already determined to be a malignant communication, using an appropriate extraction criterion including a criterion for extracting a malignant communication. The information collection and delivery server 10 determines to adopt the used extraction criterion when the ratio of malignant communications to the extracted communications exceeds the threshold (for example, 95%). This enables the information collection and delivery server 10 to adopt the extraction criterion that makes it difficult to mix a benign communication. Thus, the information collection and delivery server 10 can detect a malignant communication while decreasing false detection in which a benign communication is wrongly determined to be a malignant communication.

Exemplary Variation of First Embodiment

Using the extraction criterion adopted in the processes enables the information collection and delivery server 10 to detect a malignant communication among the log information entries that have not been determined to be a malignant communication.

Figure 11:
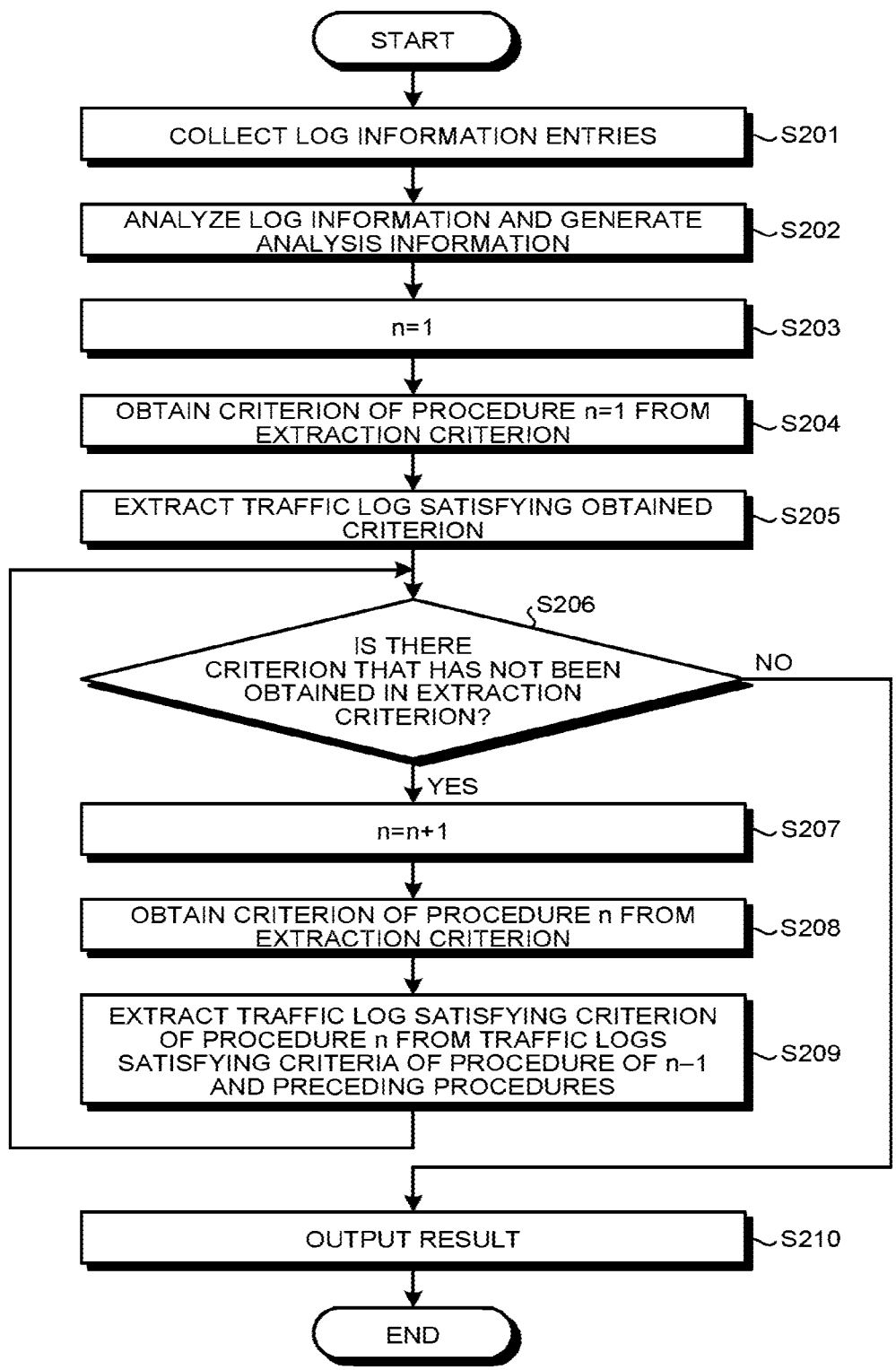
FIG. 11 is an explanatory flowchart of a process that an information collection and delivery server according to an exemplary variation of the first embodiment.

FIG. 11 is an explanatory flowchart of a process that an information collection and delivery server 10 according to an exemplary variation of the first embodiment performs. Note that FIG. 11 illustrates that a communication log extraction unit 123 extracts a malignant traffic log using also the extraction criterion adopted by an extraction criterion determination unit 124.

As illustrated in FIG. 11, the log information collection unit 121 collects a log information entry that has not been determined to be a malignant communication (step S201). Subsequently, the log information analysis unit 122 analyzes the log information and generates the analysis information (step S202).

Subsequently, the communication log extraction unit 123 sets n=1 (step S203), and obtains the criterion of a procedure n=1 from an extraction criterion (step S204). Then, the communication log extraction unit 123 extracts a traffic log satisfying the obtained criterion from the traffic logs in the analysis information (step S205).

Then, the communication log extraction unit 123 determines whether there is a criterion that has not been obtained in the extraction criterion (step S206). When there is a criterion that has not been obtained (Yes in step S206), the communication log extraction unit 123 increments n by one (step S207) and obtains the criterion of a procedure n from the extraction criterion (step S208). Then, the communication log extraction unit 123 extracts a traffic log satisfying the criterion of the procedure n from the traffic logs satisfying the criteria of the procedure of n−1 and preceding procedures (step S209). Then, the communication log extraction unit 123 goes back to step S206.

On the other hand, when there is no criterion that has not been obtained in step S206 (No in step S206), the communication log extraction unit 123 transmits the extraction results to the output control unit 125. Then, the output control unit 125 outputs the extraction results (step S210).

As described above, the information collection and delivery server 10 can detect a malignant communication among the log information entries that have not been determined to be a malignant communication, using the extraction criterion that is adopted by the extraction criterion determination unit 124. This enables the information collection and delivery server 10 to extract the characteristic information indicating the characteristic of the detected malignant communication from the log information and deliver the characteristic information to each communication monitoring device such as the decoy server 21, the decoy terminal 22, the terminal sandbox 23, the server sandbox 24, the user terminal 31 or 32, or the user server 33 or 34. In this example, the communication monitoring device can detect a communication matching the delivered characteristic information among the communications in the network.

Furthermore, for example, the information collection and delivery server 10 can determine an extraction criterion, using the log information collected in the network 2, and can apply the characteristic information extracted with the extraction criterion to the communication monitoring devices that monitor the communications in the network 2 (the decoy server 21, the decoy terminal 22, the terminal sandbox 23, and the server sandbox 24). This enables the information collection and delivery server 10 to apply the characteristic information based on the log information in the network 2 for the monitoring of the network 2. This can bring about more accurate detection of an attack. Note that, instead of this application, the information collection and delivery server 10 can apply the characteristic information based on the log information in the network 2 for the monitoring of another network.

Another Embodiment

The embodiments of the present invention have been described above. However, the present invention can be implemented not only with the embodiments but also with various different embodiments.

(Process Using Benign Communication)

For example, an example in which, when the ratio of malignant communications to the extracted communications is larger than or equal to the threshold, it is determined that the extraction criterion used for the extraction is applied has been described in the embodiments described above. However, the embodiment is not limited to the example. For example, in an embodiment, when the ratio of benign communications to the extracted communications is larger than or equal to the threshold, it can be determined not to adopt the extraction criterion used for the extraction. In other words, the extraction criterion determination unit 124 determines whether to adopt the extraction criterion used for the extraction depending on whether the ratio of a specific type of communications to the extracted communications is larger than or equal to the threshold.

(System Configuration)

Among the processes described in the present embodiment, all or some of the processes described as processes to be performed automatically can be performed manually while all or some of the processes described as processes to be performed manually can be performed automatically. Additionally, the processes, controls, specific names, various data and parameters described herein or in the drawings can arbitrarily be changed unless otherwise noted.

Each component of each device is functionally and conceptually illustrated. Each component does not necessarily have a physical structure as illustrated. In other words, the form of division or integration of the devices is not limited to the illustrated forms. All or some of the devices can functionally or physically be divided or integrated in an arbitrary unit depending on various loads or usage conditions.

(Program)

The information collection and delivery server 10 described in the embodiments can also be implemented by the execution of the prepared program by a computer. In light of the foregoing, an exemplary computer that executes an extraction criterion determination program implementing the same function as the function of the information collection and delivery server 10 illustrated in FIG. 2 will be described hereinafter.

Figure 12:
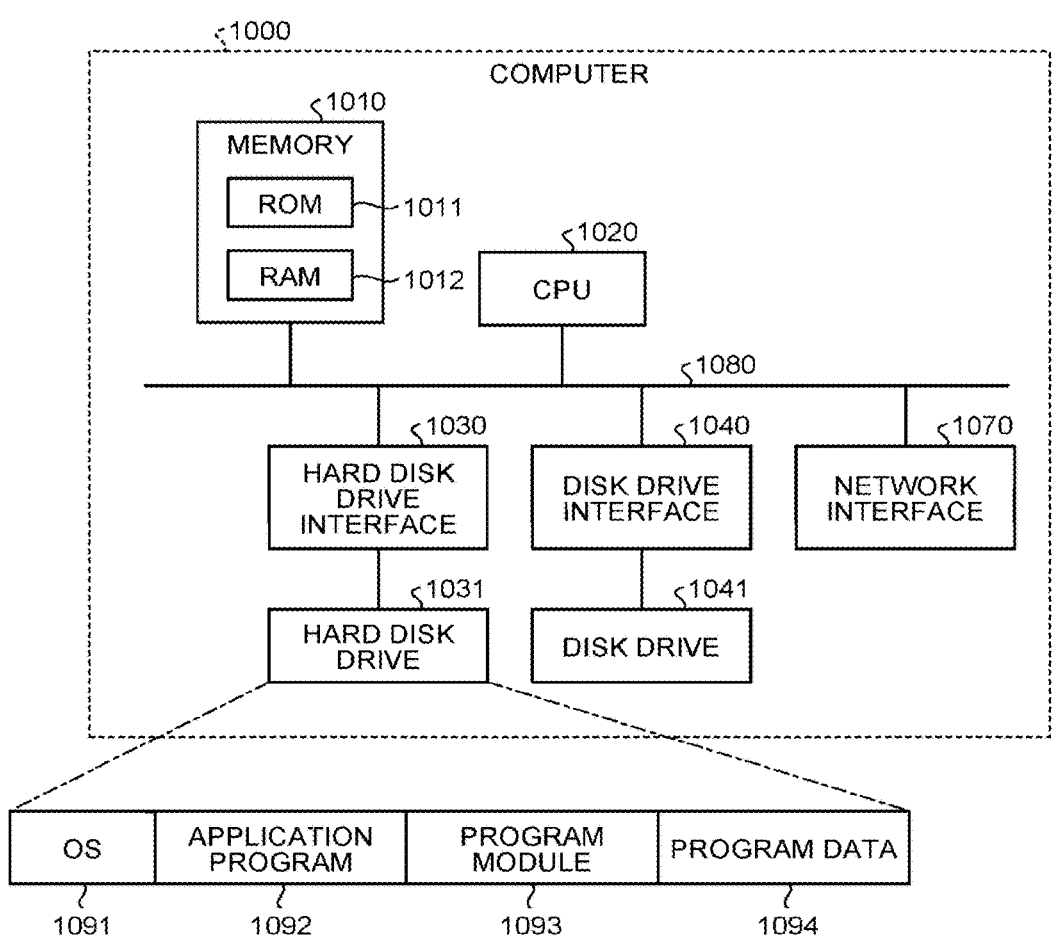
FIG. 12 is a diagram of a computer that executes an extraction criterion determination program.

FIG. 12 is a diagram of a computer 1000 that executes an extraction criterion determination program. As illustrated in FIG. 12, the computer 1000 includes, for example, a memory 1010, a CPU 1020, a hard disk drive interface 1030, a disk drive interface 1040, and a network interface 1070. The included units are connected via a bus 1080.

As illustrated in FIG. 12, the memory 1010 includes a Read Only Memory (ROM) 1011 and a RAM 1012. The ROM 1011 stores, for example, a boot program such as a Basic Input Output System (BIOS). As illustrated in FIG. 12, the hard disk drive interface 1030 is connected to a hard disk drive 1031. As illustrated in FIG. 12, a disk drive interface 1040 is connected to a disk drive 1041. For example, a detachable recording medium such as a magnetic disk, or an optical disk is inserted in the disk drive.

As illustrated in FIG. 12, the hard disk drive 1031 stores, for example, an OS 1091, an application program 1092, a program module 1093, and program data 1094. In other words, the data processing program is stored as a program module in which the instructions performed by the computer 1000 is described, for example, in the hard disk drive 1031.

Various data described in the embodiments is stored as program data, for example, in the memory 1010 and the hard disk drive 1031. The CPU 1020 reads the program module 1093 or program data 1094 stored in the memory 1010 or the hard disk drive 1031 on the RAM 1012 as necessary to perform each procedure.

The program module 1093 and program data 1094 associated with the extraction criterion determination program is stored in the hard disk drive 1031. However, the storage is not limited to the hard disk drive 1031. For example, the program module 1093 and program data 1094 can be stored in a detachable recording medium so that the CPU 1020 can read the program module 1093 and program data 1094 through the disk drive. The program module 1093 and program data 1094 associated with the data processing program can be stored in another computer connected via a network (for example, a Local Area Network (LAN), or a Wide Area Network (WAN)) so that the CPU 1020 can read the program module 1093 and program data 1094 through the network interface 1070.

The exemplary embodiments and variations are included in the technology disclosed herein, and also in a range of the invention described in the scope of claims and the equivalents.

REFERENCE SIGNS LIST

10 INFORMATION COLLECTION AND DELIVERY SERVER
12 CONTROL UNIT
13 STORAGE UNIT
121 LOG INFORMATION COLLECTION UNIT
123 COMMUNICATION LOG EXTRACTION UNIT
124 EXTRACTION CRITERION DETERMINATION UNIT
125 OUTPUT CONTROL UNIT
133 EXTRACTION CRITERION STORAGE UNIT

The invention claimed is:

1. An extraction criterion determination method performed by an extraction criterion determination apparatus that is connected to a wide area network, the method comprising:
collecting a log information entries of a communication performed in a predetermined period of time, the log information entry being determined to be a malignant communication, the log information entries being obtained from a communication monitoring device configured to collect the log information entries in a network that connects to the wide area network, wherein the wide area network is accessible by at least one of an attacker terminal, a malware distribution server, and a malicious server;
analyzing respective communication source addresses in the collected log information entries;
generating analysis information including a plurality of statistical values, for each respective communication source address, which include at least a number of communications, a statistic related to a communication interval, and a statistic related to an amount of traffic of communications;
extracting a communication satisfying a criterion from the analysis information with reference to a memory storing an extraction criterion, the criterion being used to extract the malignant communication from the log information entries, the criterion being defined in the extraction criterion, the criterion being one of a plurality of criteria that is based on the plurality of statistical values;
determining to adopt the extraction criterion when a ratio of a number of malignant communications to the extracted communications is larger than or equal to a threshold; and
performing a control to output the adopted extraction criterion which is applied for identifying future communications as malignant.

2. The extraction criterion determination method according to claim 1, wherein
the memory stores an extraction criterion defining a plurality of criteria, and
a communication satisfying the criteria is extracted from the log information entries in the extraction.

3. The extraction criterion determination method according to claim 2, wherein
the memory stores an extraction criterion in which the criteria are defined in predetermined order, and
a communication satisfying the criteria in the predetermined order is extracted from the log information entries in the extraction.

4. The extraction criterion determination method according to claim 1, wherein
an undetermined log information entry that has not been determined to be the malignant communication is collected as the log information entry in the collection,
a communication satisfying the criterion is extracted from the undetermined log information entries in the extraction, and
characteristic information indicating a characteristic of the communication extracted from the undetermined log information entries is output to the communication monitoring device in the output control so that the communication monitoring device detects a communication matching the characteristic information.

5. A communication monitoring system comprising:
a communication monitoring device that monitors communications in a network that connects to a wide area network that is accessible by at least one of an attacker terminal, a malware distribution server, and a malicious server; and
an extraction criterion determination apparatus that is connected to the wide area network,
the extraction criterion determination apparatus including:
a memory that stores an extraction criterion in which a criterion used to extract a malignant communication from log information entries of the communications is defined; and
processing circuitry configured to
collect a log information entry from the communication monitoring device, the log information entry being log information of a communication in a predetermined period of time, the log information entry being determined to be the malignant communication;
analyze respective communication source addresses in the collected log information entries;
generate analysis information including a plurality of statistical values, for each respective communication source address, which include at least a number of communications, a statistic related to a communication interval, and a statistic related to an amount of traffic of communications;
extract a communication satisfying the criterion from the collected log information entries with reference to the memory, the criterion being one of a plurality of criteria that is based on the plurality of statistical values;
determine to adopt the extraction criterion when a ratio of a number of malignant communications to the extracted communications is larger than or equal to a threshold; and
perform a control to output the adopted extraction criterion which is applied for identifying future communications as malignant.

6. The communication monitoring system according to claim 5, wherein
the processing circuitry
collects an undetermined log information entry that has not been determined to be the malignant communication as the log information entry,
extracts a communication satisfying the criterion from the undetermined log information entries,
outputs characteristic information indicating a characteristic of the communication extracted from the undetermined log information entries to the communication monitoring device, and
detects a communication matching the output characteristic information from the communications in the network.

7. An extraction criterion determination apparatus that is configured to connect to a wide area network comprising:
a memory that stores an extraction criterion in which a criterion used to extract a malignant communication from log information entries of communications is defined; and
processing circuitry configured to
collect a log information entry, the log information entry being log information of a communication in a predetermined period of time, the log information entry being determined to be the malignant communication, the log information entry being obtained from a communication monitoring device configured to collect the log information entry in a network that connects to the wide area network, wherein the wide area network is accessible by at least one of an attacker terminal, a malware distribution server, and a malicious server;

analyze respective communication source addresses in the collected log information entries;

generate analysis information including a plurality of statistical values, for each respective communication source address, which include at least a number of communications, a statistic related to a communication interval, and a statistic related to an amount of traffic of communications;

extract a communication satisfying the criterion from the collected log information entries with reference to the memory, the criterion being one of a plurality of criteria that is based on the plurality of statistical values;

determine to adopt the extraction criterion when a ratio of a number of malignant communications to the extracted communications is larger than or equal to a threshold; and perform a control to output the adopted extraction criterion which is applied for identifying future communications as malignant.

8. A non-transitory computer-readable recording medium having stored an extraction criterion determination program for causing an extraction criterion determination apparatus that is connected to a wide area network to execute a process comprising:

collecting a log information entry of a communication performed in a predetermined period of time, the log information entry being determined to be a malignant communication, the log information entry being obtained from a communication monitoring device configured to collect the log information entry in a network that connects to the wide area network, wherein the wide area network is accessible by at least one of an attacker terminal, a malware distribution server, and a malicious server;

analyzing respective communication source addresses in the collected log information entries;

generating analysis information including a plurality of statistical values, for each respective communication source address, which include at least a number of communications, a statistic related to a communication interval, and a statistic related to an amount of traffic of communications;

extracting a communication satisfying a criterion from the analysis information with reference to a memory storing an extraction criterion, the criterion being used to extract the malignant communication from the log information entries, the criterion being defined in the extraction criterion, the criterion being one of a plurality of criteria that is based on the plurality of statistical values;

determining to adopt the extraction criterion when a ratio of a number of malignant communications to the extracted communications is larger than or equal to a threshold; and performing a control to output the adopted extraction criterion which is applied for identifying future communications as malignant.

* * * * *